United States Patent
Ho et al.

(10) Patent No.: US 7,401,496 B2
(45) Date of Patent: Jul. 22, 2008

(54) COTTON MODULE BUILDER CALIBRATION

(75) Inventors: Yun Ren Ho, Naperville, IL (US); Michael J. Covington, Germantown, TN (US); George H. Hale, Arlington, TN (US)

(73) Assignee: CNH America LLC, New Holland, PA (US)

(*) Notice: Subject to any disclaimer, the term of this patent is extended or adjusted under 35 U.S.C. 154(b) by 502 days.

(21) Appl. No.: 11/229,923

(22) Filed: Sep. 19, 2005

(65) Prior Publication Data

US 2007/0066375 A1    Mar. 22, 2007

(51) Int. Cl.
*G01B 21/00* (2006.01)
*A01D 46/12* (2006.01)

(52) U.S. Cl. .............. 73/1.79; 56/28; 100/99; 701/50; 702/94

(58) Field of Classification Search ......... 73/1.79–1.81, 73/1.75; 702/94; 701/49–50, 116; 700/302; 56/10.2 R, 10.2 D–10.2 E, 28, 36, DIG. 15; 100/43, 48, 99
See application file for complete search history.

(56) References Cited

U.S. PATENT DOCUMENTS

| | | | |
|---|---|---|---|
| 3,222,851 A * | 12/1965 | Schnaidt et al. .......... 56/10.2 R |
| 4,147,016 A * | 4/1979 | Jensen et al. .................. 56/15.8 |
| 4,362,033 A * | 12/1982 | Young .......................... 68/207 |
| 4,930,297 A | 6/1990 | Schlueter et al. |
| 5,025,614 A | 6/1991 | Orsborn et al. |
| 5,473,870 A * | 12/1995 | Panoushek et al. ........ 56/10.2 E |
| 5,484,337 A | 1/1996 | Robinson et al. |
| 5,584,762 A | 12/1996 | Buhler et al. |
| 6,121,782 A | 9/2000 | Adams et al. |
| 6,176,779 B1 * | 1/2001 | Riesterer et al. ............ 56/28 X |
| 6,208,257 B1 | 3/2001 | Choi |
| 6,242,927 B1 | 6/2001 | Adams et al. |
| 6,366,210 B2 | 4/2002 | Lemke |
| 6,489,784 B2 | 12/2002 | Adams et al. |
| 6,530,199 B1 | 3/2003 | Covington et al. |
| 6,536,197 B1 | 3/2003 | Covington et al. |
| 6,633,798 B2 | 10/2003 | Daniel et al. |
| 6,669,557 B2 | 12/2003 | Adams et al. |
| 6,766,634 B2 | 7/2004 | Covington et al. |
| 7,059,242 B2 * | 6/2006 | Lemke et al. ................ 56/28 X |
| 7,093,536 B1 * | 8/2006 | Archer et al. ................ 56/28 X |
| 7,275,357 B2 * | 10/2007 | Covington et al. ............. 56/28 |
| 2002/0178710 A1 * | 12/2002 | Engelstad et al. ......... 56/10.2 E |
| 2004/0054441 A1 | 3/2004 | Stamps et al. |

* cited by examiner

*Primary Examiner*—Thomas P Noland
(74) *Attorney, Agent, or Firm*—Michael G. Harms; John William Stader; Patrick M. Sheldrake (57) ABSTRACT

A system and method for calibrating a cotton module builder having a compactor frame, the system including an electronic controller configured to move the compactor frame to a plurality of positions, to read a compactor frame position sensor or sensors in the first and second positions, and to calibrate the sensor or sensors based on the sensor readings.

18 Claims, 8 Drawing Sheets

COTTON MODULE BUILDER CALIBRATION

FIELD OF THE INVENTION

This invention relates generally to calibrating a cotton module builder, and more particularly, to calibrating cotton module builder augers and position sensors.

BACKGROUND OF THE INVENTION

Traditionally, the process of harvesting cotton included several steps. First, the cotton is gathered by a cotton harvester (called herein a "picker") that traveled through the agricultural field separating the cotton bolls from the stalk and leaves of the cotton plant. The cotton bolls are then blown into a basket on the picker. Once the basket is full of loose cotton bolls, the picker either travels to a "module builder" which receives the loose cotton bolls, and compacts them to form a matted, compressed block or "module" of cotton, or alternatively loads the collected cotton bolls into a "boll buggy" (i.e. a wagon) that is configured to receive cotton bolls from the picker and transport them to the module builder. These modules are typically left in the field until a third vehicle can take them to a cotton gin for further processing.

In recent years this traditional process has been shortened. Instead of picking the cotton bolls, loading a boll buggy and taking it to a module builder, the step of picking and module building are combined. The picking and module building are performed simultaneously by a self-propelled picker/module builder. This picker/module builder travels through the field picking cotton and simultaneously building a module from that cotton.

Using this new process (and equipment), a farmer can eliminate the need for a boll buggy and separate module builder. Instead, the picker/module builder creates modules as it moves through the field harvesting cotton, leaving the modules in place in the field as they are created, much as hay balers leave bales of hay behind them in the field. The picker/module builder can travel much further before it needs to stop and unload, since it packs the cotton as it picks and therefore creates a much larger payload in the same space.

The picker/module builder includes a header which harvests the cotton, strips it of leaf and stalk, and blows the cotton bolls into a chamber on the back of the picker/module builder. This chamber combines a basketlike structure with a compactor frame. The picker/module builder periodically cycles the compactor frame up and down to successively packed layers of loose cotton bolls.

The header which compels the cotton bolls into the chamber does not automatically distribute the cotton evenly. Typically, when the picker/module builder is empty, cotton bolls are blown into the rear of the chamber. As the chamber fills, cotton bolls are blown into the front of the chamber. In order to create a module of relatively constant density, the cotton bolls must be distributed within the chamber underneath the compactor frame. To do this, the compactor frame is equipped with several augers oriented fore-and-aft with respect to the picker/module builder. When the augers are driven in one direction, they pull cotton from the front of the vehicle to the rear of the vehicle underneath the compactor frame. When driven in the opposite direction, the augers will pull cotton from the rear of the vehicle to the front of the vehicle. In this manner, the picker/module builder distributes the cotton evenly as it compacts successive layers of cotton blown into the chamber.

In order to determine what direction to drive the augers, the picker/module builder has several sensors that detect the relative orientation of the compactor frame when it is lowered into contact with the cotton in the chamber. If more cotton has been blown and then piled up in the rear of the chamber, the front part of the compactor frame will be pressed down farther than the rear part of the compactor frame. Sensors are provided on the picker/module builder to determine the relative orientation of the compactor frame. The sensors detect whether the compactor frame is higher in the front than in the rear (indicating that too much cotton is being piled up in the front of the chamber and must be shifted to the rear by the augers), or higher in the rear at than in the front (indicating that too much cotton is being piled up in the rear of the chamber and must be shifted to the front by the augers.

The sensors must detect relatively small tilt angles of the compactor frame with respect to the chamber. Providing accurate measurements of small angles requires careful maintenance of the sensors. If they are bumped or twisted, if their electronic circuits drift in calibration, or if their linkages to the compactor frame are bent or otherwise shifted from their design positions, the signals provided by the position sensors can be in error. When the sensors provide erroneous signals, controller 106 does not drive the augers in the proper direction, or for the proper length of time and the cotton is not level.

What is needed, therefore, is a system and method for quickly calibrating the module builder's, compactor's and auger's operation by calibrating the sensors that detect the position of the augers and compactor frame of the module builder with respect to the compactor chamber. It is an object of this invention to provide such a system and method.

SUMMARY OF THE INVENTION

In accordance with a first aspect of the invention, a system for calibrating a cotton module builder is provided, the system including means for moving the compactor frame between first and second positions; means for sensing the position of the compactor frame in the first and second positions; and electronic control means for receiving a first signal from the means for sensing indicating the first position of the compactor frame, receiving a second signal from the means for sensing indicating the second position of the compactor frame after receiving the first signal, and calibrating the means for sensing based upon the first and the second signals.

The electronic control means may include means for automatically moving the compactor frame to the first predetermined position before receiving the first signal; and means for automatically moving the compactor frame to the second predetermined position after receiving the first signal and before receiving the second signal. One of the first and second predetermined positions may be an uppermost position of the compactor frame, and the other of the first and second predetermined positions may be a lowermost position of the compactor frame. The compactor frame may be configured for fore-and-aft pivotal movement between the first predetermined position and the second predetermined position, and further wherein the compactor frame may be constrained from pivoting fore-and-aft in both the first predetermined position and the second predetermined position. The means for sensing may include means for generating signals indicating both the vertical position of the compactor frame and a fore-and-aft tilt of the compactor frame, and further wherein the electronic control means may include means for simultaneously calibrating the at least one sensor to provide both a corrected vertical position and a corrected fore-and-aft tilt of the compactor frame. The electronic control means may be configured to automatically and sequentially receive the first signal, receive the second signal, and calibrate the means for sensing after an operator calibration request.

DETAILED DESCRIPTION OF THE PREFERRED EMBODIMENTS

Figure 1:
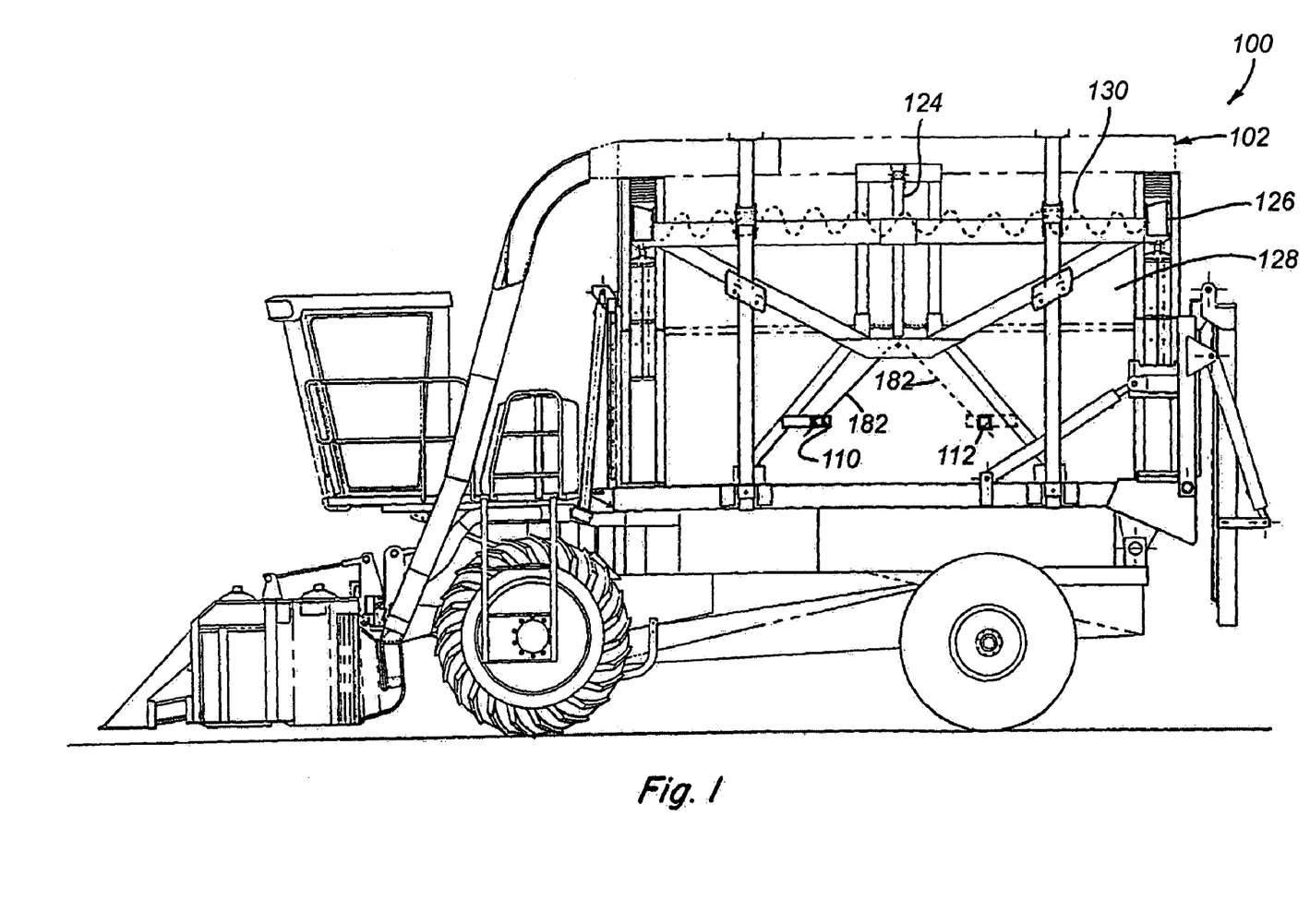
FIG. 1 is a side view of a cotton harvester with cotton module builder, (or "picker/module builder").

Turning now to the drawings, in FIG. 1, a cotton harvester 100 is shown, including an on-board cotton module builder 102 for compacting cotton harvested by harvester 100 into a unitary cotton module (not shown) according to the invention. This is also called a "picker/module builder" herein.

Figure 2:
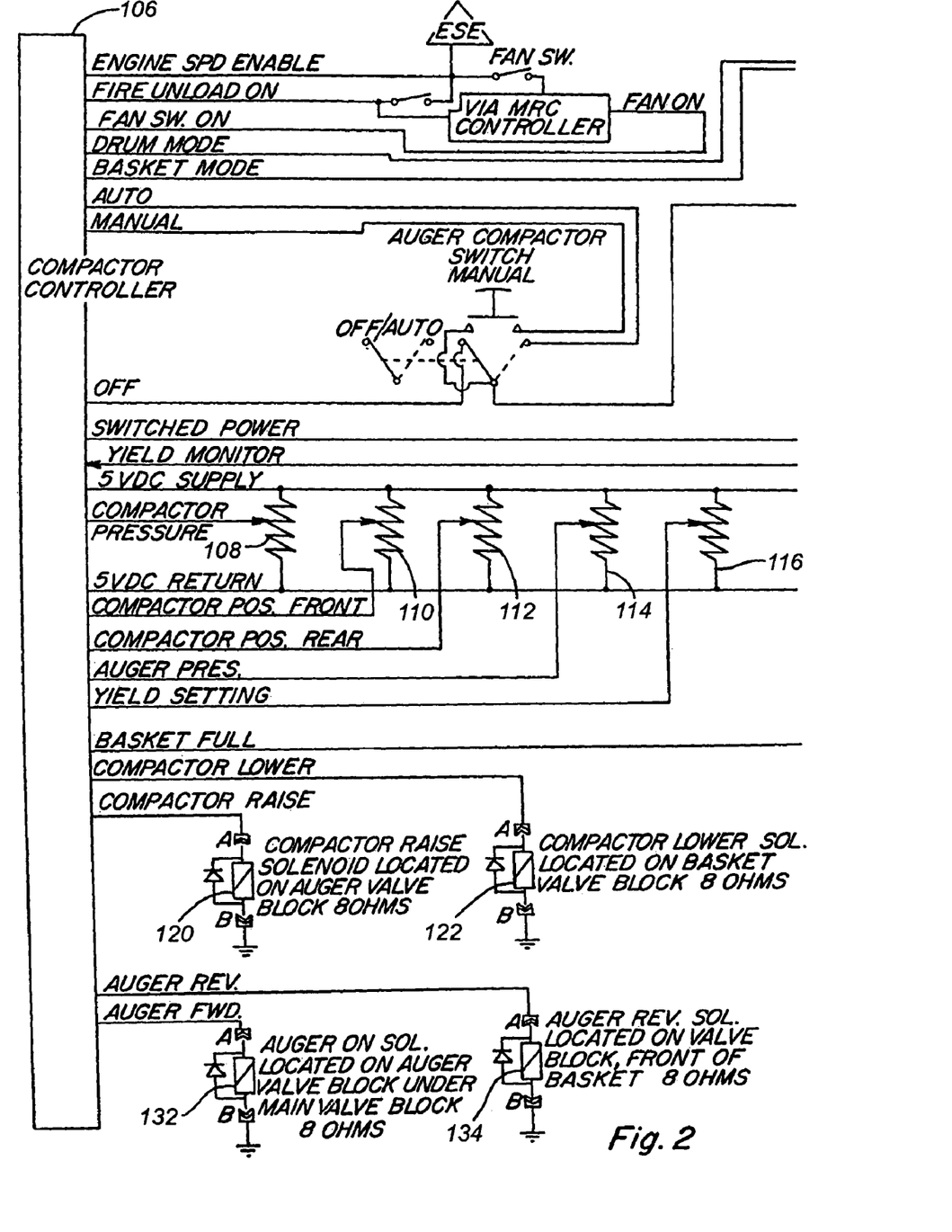
FIG. 2 is a schematic diagram of a cotton module builder control operable using a compactor position sensing routine.
Figure 2A:
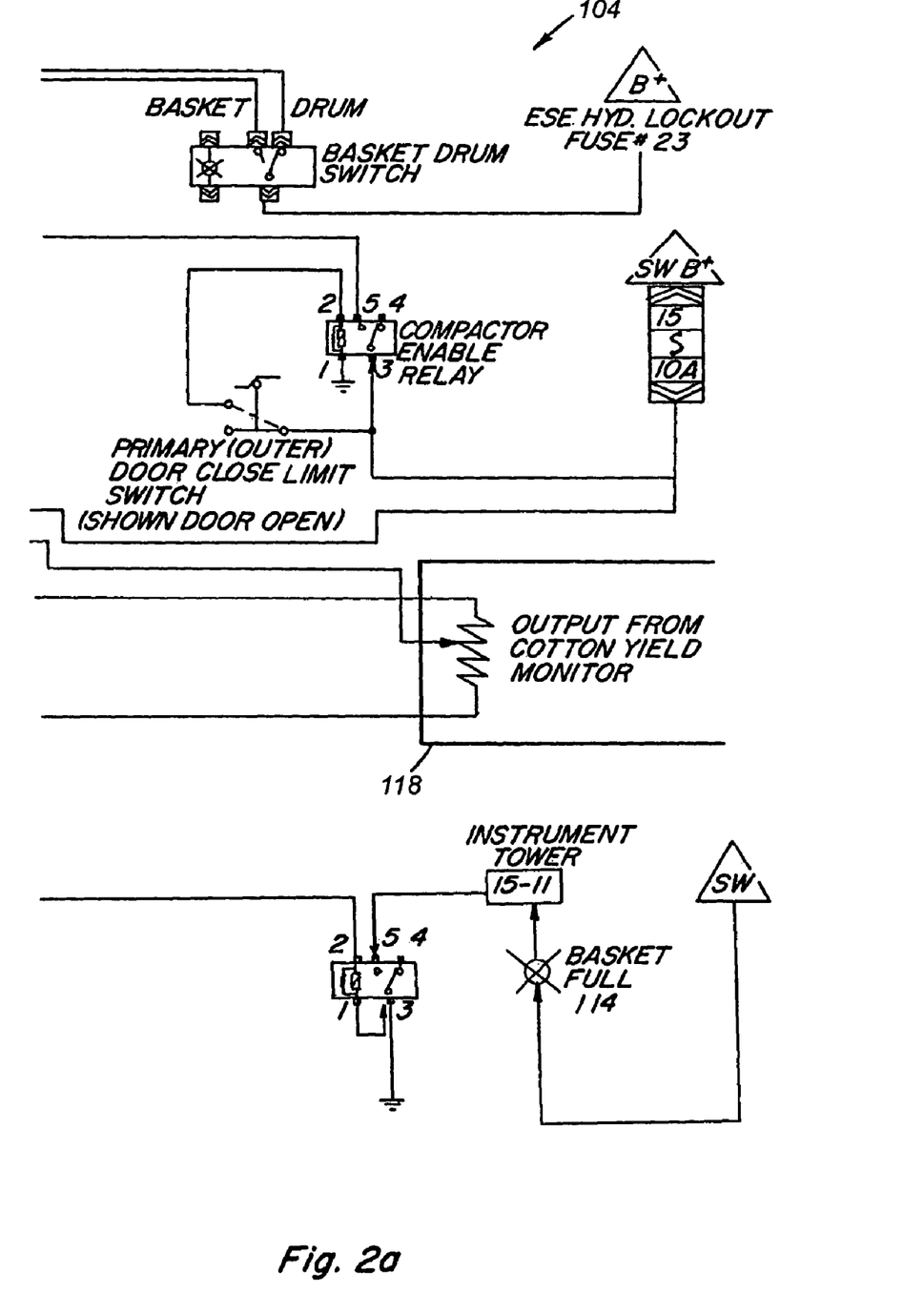
FIG. 2A is a continuation of the schematic diagram of FIG. 2.

Referring also to FIGS. 2 and 2A, circuitry of a compactor control 104 operable according to the present invention is shown. Control 104 includes an electronic compactor controller 106 operable for receiving signals outputted by a number of devices, including, but not limited to, a compactor pressure signal from a compactor pressure sensor 108, compactor position signals outputted by two compactor position sensors 110 and 112, auger pressure signal outputted by auger pressure sensor 114, and a yield signal outputted by an operator controlled yield setting 116 or a cotton yield monitor 118. Responsive to the signals from these devices, and/or other devices, controller 106 is operable for automatically responsively outputting signals to apparatus such as a compactor raise solenoid 120 and a compactor lower solenoid 122, which control compactor drivers, e.g. hydraulic valves (not shown) that conduct fluid to and from fluid cylinders 124 of module builder 102 (FIG. 1) operable for moving compactor apparatus 126 of module builder 102 upwardly and downwardly against cotton accumulated in a bottom region of a compactor chamber 128 of module builder 102. The drivers can also be used for setting or indexing the compactor position. Compactor control 104 is also operable for outputting signals to augers 130 (FIG. 1) of compactor apparatus 126, for effecting forward or reverse rotation thereof via an auger forward solenoid 132 and an auger reverse solenoid 134. Electronic compactor controller 106 is preferably a digital microcontroller such as one of the IQAN series of controllers manufactured by Parker Hannifin that include a display module (MDM) with integral main controller and an I/O module coupled to the MDM over a CAN bus. Alternatively, electronic compactor controller 106 may be a digital microcontroller such as a Pecktron XCM series of microcontrollers, which have a Siemens 167 series processor. Controller 106 also includes internal memory circuits which hold preprogrammed electronic instructions that control the operation of the picker/module builder as described herein.

Control 104 need not be an electronic circuit coupled to electronic components. It may, alternatively, be a hydraulic or pneumatic circuit incorporating variable fluid flow control valves that substantially duplicate the function of the electrical circuits described and illustrated herein.

Figure 3:
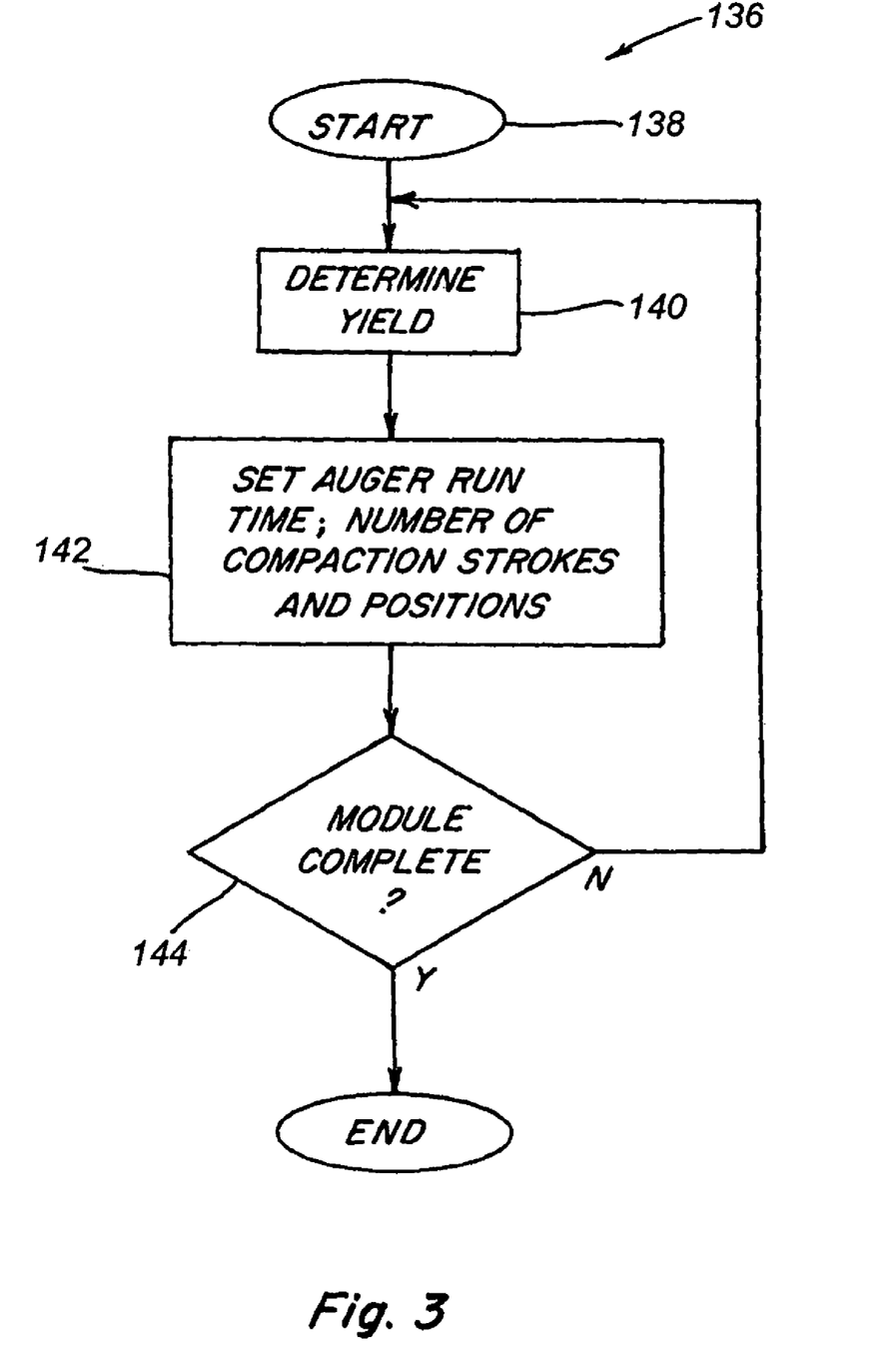
FIG. 3 is a high level functional operation diagram showing the operation of the system as commanded by controller 106 in accordance with its associated electronic programmed instructions.

Referring also to FIG. 3, a high level functional operation diagram 136 is shown, including preferred steps for operation of compactor control 104 by controller 106 as it executes a series of preprogrammed electronic instructions stored in its memory circuits. After start block 138, control 104 will optionally determine the cotton yield based on signals from cotton yield monitor 118, as denoted at block 140. Control 104 will set parameters such as, but not limited to, the auger run time, direction of operation, and number of compaction strokes, and the positions of compactor apparatus 126 within compactor chamber 128, as denoted at block 142. As the module building process proceeds, compactor control 104 will either cycle through the steps of blocks 140-142 or end the routine if the module is complete, as denoted by block 144. As noted above, as the module nears completion, for instance, when the module exceeds a predetermined weight, compactor control 104 can output a module complete signal, such as a light or an audio signal, to alert the operator.

Figure 4:
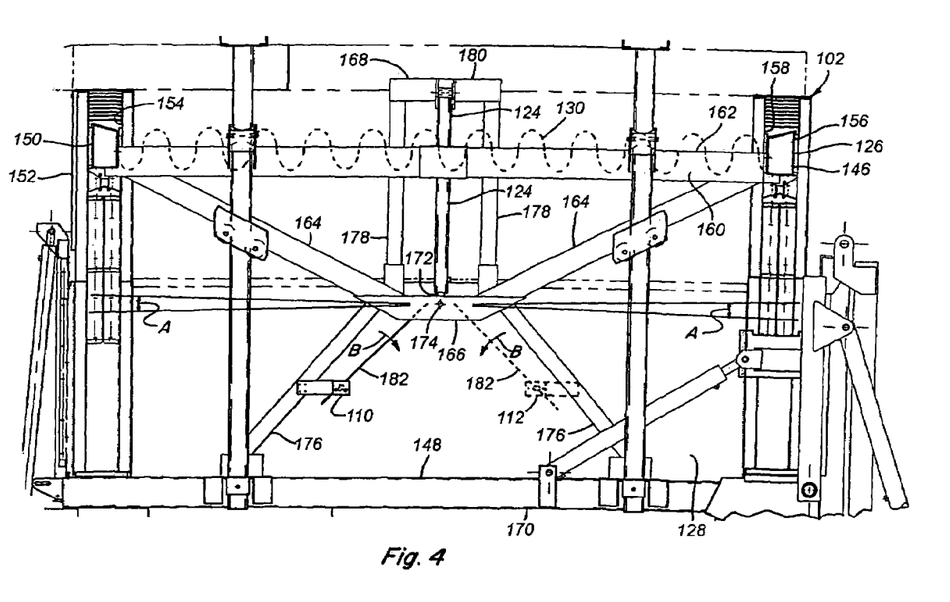
FIG. 4 is a fragmentary side view of the cotton module builder, showing compactor apparatus thereof tilted.
Figure 5:
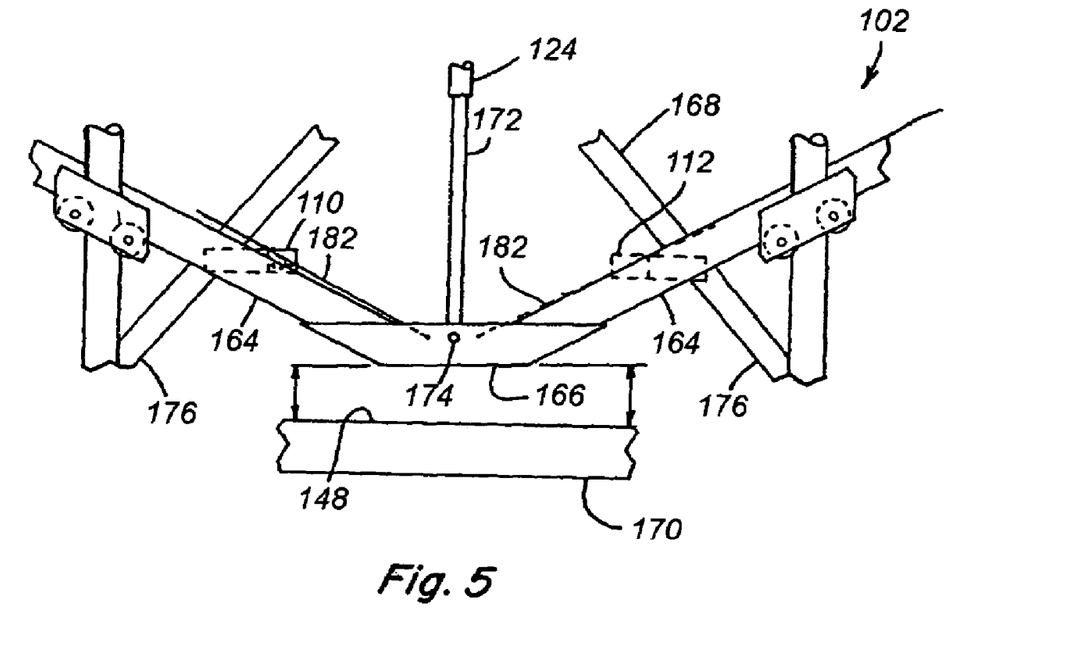
FIG. 5 is a fragmentary side view of the module builder showing the compactor apparatus tilted at a lowered position.

Referring also to FIGS. 4 and 5, compactor apparatus 126 includes a compactor frame 146 which is oriented generally horizontally, or within a range of small acute angles relative to horizontal, and substantially disposed within compactor chamber 128, for movement downwardly against cotton contained therein for compacting the cotton against a floor 148 therein. Compactor frame 146 includes a front cross member 150 disposed in chamber 128 adjacent a front wall 152, and having opposite ends which extend through sidewardly open slots 154 in module builder 102. Similarly, a rear cross member 156 is disposed in chamber 128 and has opposite end portions which extend through sidewardly open slots 158 in the module builder. Augers 130 are supported in forward and rearward extending relation between cross members 150 and 156 within chamber 128. Augers 130 can be rotated using any suitable commercially available drivers, such as a gear drive driven by a motor such as a fluid or electric motor, or directly by fluid or electric motors, as desired, and as controlled by auger solenoids 132 and 134, for distributing the collected cotton in chamber 128 as will be explained. In this regard, it should be noted that it is desirable and a sought after feature to distribute the cotton evenly with respect to the plane of floor 148, such that the resultant compacted cotton module will have a substantially uniform height and density along its length and width.

Compactor frame 146 of compactor apparatus 126 is supported in compacting chamber 128 on each side by an exterior side structure 160, each structure 160 including a forwardly and rearwardly extending main beam 162 which extends between and connects front and rear cross members 150 and 156. Each side structure 160 additionally includes a pair of braces 164 which extend downwardly and at converging angles from front and rear cross members 150 and 156, and which are connected together by a gusset 166 located below the middle of main beam 162. Here, it should be noted that compactor frame 146 located within compacting chamber 128 and exterior side structures 160 on the exterior of module builder 102 are movable upwardly and downwardly together.

The upward and downward movement of exterior side structures 160 and compactor frame 146 is preferably achieved and controlled by fluid cylinders 124 extending, respectively, between gussets 166 of each exterior side structure 160 and a support frame 168 supported by and extending upwardly from a frame 170 of module builder 102. Importantly, a rod 172 of each cylinder 124 is connected to gusset 166 at a pivot 174 which allows limited pivotal movement of side structure 160 and thus compactor frame 146 and augers 130 of compactor apparatus 126 about a side-to-side extending pivotal axis within a limited range of pivotal movement, as denoted by arrows A.

Support frame 168 on each side of module builder 102 includes a pair of diagonally extending braces 176 having lower ends connected to frame 170, and upper ends which connect to and support vertical braces 178 which support a cross member 180 to which fluid cylinder 124 is attached. A more forward brace 176 of support frame 168 on that side of module builder 102 facing outwardly from the page, and the more rearwardly located brace 176 on the opposite side of the module builder, support the compactor position sensors 110 and 112, respectively. Each compactor position sensor 110 and 112 includes an elongate actuator arm 182 which pivotally connects to gusset 166 on that side of the module builder. Each sensor 110 and 112 is a rotary type sensor, which will detect rotational movement of the respective actuator arm 182, as denoted by arrows B, as compactor apparatus 126 is moved from the positions shown in FIGS. 1 and 4, for instance, to the lower position shown in FIG. 5. Because two compactor position sensors 110 and 112 are used, movements of compactor apparatus 126 at a tilt, such as denoted by arrow A, will result in different rotational displacements of actuator arms 182 of the respective sensors 110 and 112, and thus the sensors will output different positional values. Thus the signals generated by sensors 110, 112 indicate both the height of compactor frame 146, and its angle of tilt. The difference between the two signal values are utilized by controller 106 to determine both the vertical position of compactor apparatus 128, the magnitude of any tilt thereof, such as denoted by arrow A, and the direction of that tilt.

Compactor position sensors can include, for instance, potentiometers, which vary a voltage or current signal when an input thereof is rotated. Alternatively, compactor position sensors can include shaft encoders, or linear sensors (e.g. LVDTs) coupled to the compactor frame to detect the height of the frame at one or more positions. A linear sensor (e.g. for determining vertical height of the frame) and a rotational sensor (e.g. for detecting the tilt angle of the frame) can also be employed. Rotary sensors can also be employed to measure linear distance by rotationally coupling them to a rack, and fixing a rack on a movable structure such as the compactor frame. As the rack moves with respect to the compactor frame, the rotary sensor rotates. Alternatively, a line may be wound around the shaft of a rotary sensor and be attached to a structure (such as the compactor frame, or chamber) that moves with respect to the sensor. In this manner relative movement will rotate the shaft.

The sensors do not need mechanical structures or linkages coupling them to and between compactor frame 146 and the compactor chamber or other structure with respect to which the compactor frame 146 moves. For example, noncontact sensors, such as laser, ultrasonic, or radar range-finding sensors can be employed to determine the position of the compactor frame with respect to the chamber. Similarly, the angular orientation of the compactor frame can also be determined using noncontact methods, such as (for example) by reflecting electromagnetic radiation (e.g. light, or radio waves) off the module builder, and receiving the reflected signal on an electromagnetic radiation detector. Using this arrangement, when the compactor frame is tilted the reflected signal will move across the detector. In yet another embodiment, an inductive sensor can be employed to detect the proximity (i.e. position) of the compactor frame with respect to the chamber.

The sensor need not be located in the positions illustrated herein. As long as the sensor indicates the relative movement of the compactor frame with respect to the rest of the chamber, and thus how full or empty the chamber is, the particular mounting point of the sensor is not essential.

In the embodiment illustrated herein, actuators 182 can be slidable relative to the input to prevent binding when rotated as denoted by arrows B, and also when rotated in the opposite direction. For instance, a vertical position of the compactor apparatus can be determined from an average of the values output by sensors 110 and 112.

Figure 6:
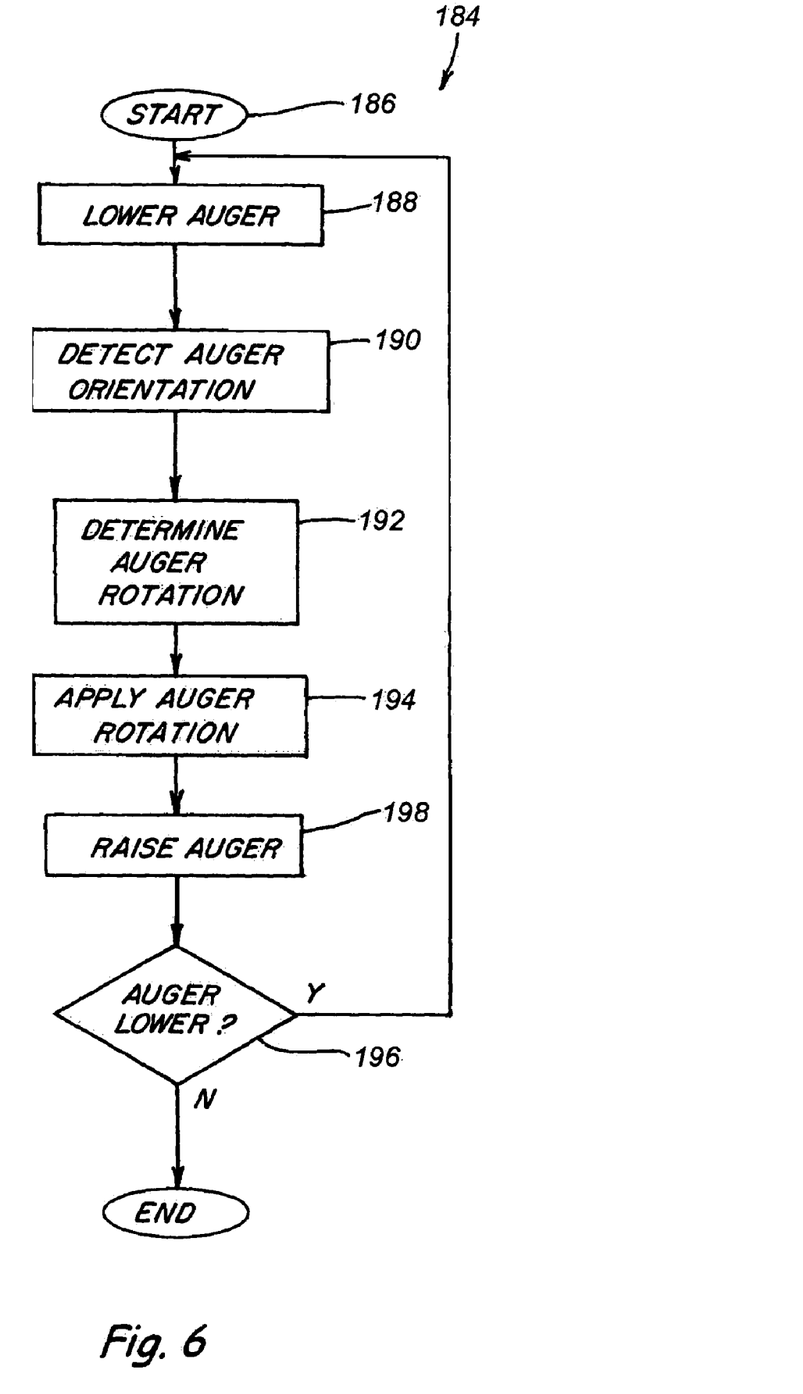
FIG. 6 is a high level functional operation diagram showing the operation of a compactor position routine as commanded by controller 106 in accordance with its associated electronic programmed instructions.

FIG. 6 shows the steps of a routine for determining appropriate directions of rotation, and also possibly duration of rotation, of augers 130. These steps are performed by controller 106. After a start block 186, compactor apparatus 126 is lowered to lower the augers 130, as denoted at block 188. At block 190, the orientation, that is, any tilt of augers 130 is detected, using signals from sensors 110 and 112, generally as described above. Controller 106 will then determine the appropriate direction, and possibly duration, of the auger rotation, and apply that rotation, as denoted at blocks 192 and 194. Here, generally, if compactor apparatus 126 is tilted such that the rearward end is located higher than the forward end, the controller is configured to determine how much rotation in a forward direction would be appropriate, and the angle of the tilt can optionally be used in determining a projected or initial duration of the rotation. As one option, the augers can be operated for the determined time period or until the auger meets a predetermined resistance, and then be automatically raised as indicated by block 198. Controller 106 can periodically repeat this process as indicated by block 196.

As recited above, position sensors 110, 112 may provide erroneous readings. These readings can be erroneous for several reasons well known to those skilled in the art such as aging of sensor components, moisture, breakdown of insulation, and bent linkages, (in this case actuator arms 182), among other reasons. When this happens, the controller 106 may drive the augers in the wrong direction.

Figure 7:
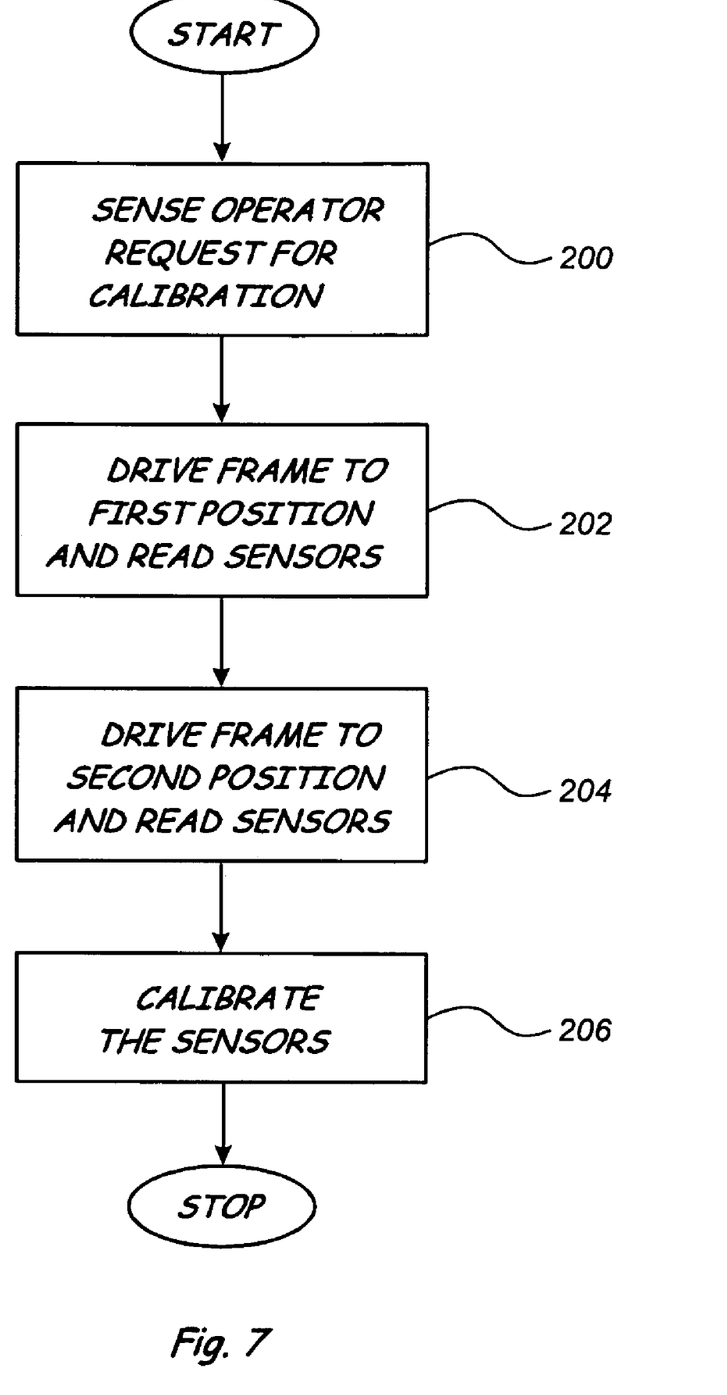
FIG. 7 is a high level functional operation diagram showing steps of a module builder calibration routine performed by controller 106 in accordance with its associated electronic programmed instructions as it calibrates the module builder, auger operation, and sensors.

To prevent this, controller 106 is configured to execute a special calibration process on the operator's command. This calibration process is stored as a series of electronic instructions in the digital memory of controller 106 that configure controller 106 to calibrate the sensors. FIG. 7 illustrates this calibration process.

Referring now to FIG. 7, the calibration process begins at step 200 in which the controller senses a request by the operator to perform the calibration process. In the preferred embodiment, the operator requests calibration by (1) turning the vehicle ignition switch (not shown) "on" (but not starting the vehicle), and (2) pressing a button (not shown) in the operator compartment coupled directly (or alternatively indirectly) to controller 106. The operator can then start the vehicle. Once started, controller 106 automatically performs the sensor calibration process.

Once the vehicle is running, and the operator has requested calibration, controller 106 drives the compactor frame to a first predetermined position in step 202. In this case, the position is the lowermost position of the compactor frame in the compactor chamber. In this position, the compactor frame abuts portions of the compactor chamber which hold it in a predetermined position. In this lowermost position, the front and rear cross members 150, 156 of the frame abut the bottom of slots 154, 158, respectively. Alternatively, the compactor frame may be configured to abut the bottom of compactor chamber 128, or any other mechanical stop arranged to position the compactor frame 146 in a first predetermined position.

In the preferred embodiment, controller 106 drives compactor frame 146 to this position by energizing solenoid 122, which is coupled to a hydraulic valve (not shown) that is coupled to and control hydraulic fluid flow to and from cylinders 124. Controller 106 energizes this valve for a predetermined period of time sufficient to drive the compactor frame to the first predetermined position (e.g. the very bottom of the chamber, or the lowermost limit of motion of the compactor frame, or the position at which the compactor frame is abutting a mechanical stop of some form and can travel downward no further). Since the position sensors 110, 112 are being calibrated, they obviously cannot be relied upon to determine when the compactor frame reaches the first predetermined position. In an alternative configuration, a limit switch, or other presence/absence switch or sensor may be provided in addition to the sensors described herein. This additional device or devices can be coupled to controller 106 and can be responsive to frame 146 when it reaches the first predetermined position.

Once in the first predetermined position, controller 106 reads the sensor signals from position sensors 110, 112 and saves them in the memory circuits of controller 106. In the preferred embodiment, in which members 150, 156 abut the bottom of slots 154, 158, the first predetermined position is the lowest position in the operable range of the compactor frame 146. Thus, the signals provided by sensors 110, 112 are signals generated at one end or limit of the range of signals generated by the sensors.

In step 204, electronic controller 106 then commands the compactor frame 146 to move to a second predetermined position, and reads and saves the sensor signals at that position. In the preferred embodiment the second predetermined position is the uppermost limiting position of the compactor frame. Preferably, it is the position in which compactor frame 146 abuts mechanical stops and can be raised no more. Even more preferably, it is the position in which front cross member 150 and rear cross member 156 abut the top of slots 154, 158 and can travel upward no more. In this uppermost position, the location and angular orientation of compactor frame 146 is fixed. Frame 146 cannot tilt either forward or backward. The mechanical stops which it abuts (i.e. preferably the top of slots 154, 158) hold it fixed with respect to the compactor chamber, which is preferably parallel to the bottom of the chamber and also parallel to the position of the compactor frame 146 in its first predetermined position.

In the preferred embodiment, controller 106 drives the frame to the second predetermined position by energizing solenoid 120 which opens a hydraulic valve (not shown) that is coupled to and controls hydraulic fluid flow to and from cylinders 124, causing them to raise the compactor frame. Controller 106 energizes these valves for a predetermined period of time sufficient to drive the compactor frame to the second predetermined position (e.g. the very top of the chamber, or the position at which the compactor frame is abutting a mechanical stop of some form, or a position at which the compactor frame can travel upward no further). Since the position sensors 110, 112 are being calibrated, they obviously cannot be relied to determine when the compactor frame reaches the second predetermined position. In an alternative configuration, a limit switch or other presence/absence switch or sensor (not shown) may be provided in addition to the sensors described herein. This additional device or devices is coupled to controller 106 and is responsive to frame 146 when it reaches the second predetermined position.

Once controller 106 has driven the compactor frame to the second predetermined position, it reads the signals from sensors 110, 112 and saves them in memory circuits of controller 106. The signals provided by sensors 110, 112 are therefore signals generated at the other end or limit of the range of signals generated by the sensors.

In step 206, controller 106 calibrates the sensor signals, thereby calibrating the module builder, and operation of the augers. In the preferred embodiment, controller 106 calibrates the sensor signals by using the values of the signals recorded during calibration steps 202, 204 to determine a correction equation or transfer function that, will generate the correct height and orientation of the compactor frame.

In the preferred embodiment, the sensors are rotary sensors that generating a voltage signal ranging from 0.5 to 4.5 volts when the sensor shaft is rotated through an angle of 90°. The actuator arm 182 extending from the rotatable sensor shaft engages the compactor, sensing its position and rotating as the compactor rises and falls. The preferred hydraulic cylinder has a 42 inch stroke, and the sensors are arranged to rotate 90° (from −45° to +45°) as hydraulic cylinders 124 raises the compactor from a height of zero inches to a height of 42 inches.

Due to this physical relationship the height of the compactor can be determined in accordance with the following function:

$$h = 21*\tan(theta) + 21 \qquad \text{eqn. 1}$$

Where "theta" is the rotational angle of the sensor which can vary between −45 and +45°, and "h" is the height of the compactor which can vary between zero (when it is resting on or near the bottom of the module builder chamber) and 42 inches. Of course, the particular values of this equation depend upon the orientation and placement of the sensors, and the geometry of the vehicle.

The physical relationship of compactor height versus rotational angle is programmed into controller 106. Controller 106 uses this programmed relationship to determine the height of the compactor in step 206.

The angle theta is calculated by controller 106 according to the following sensor equation. This sensor equation is a function of the particular sensor that is used in this embodiment and represents the linear relationship between the sensors' output and the rotational position of the sensors' shaft. For the preferred sensors 110, 112, the ideal signal varies from 0.5 to 4.5 volts when theta (the rotational angle of the sensors' shaft) varies from −45 to +45°, respectively, or:

$$theta = M * signal + B \qquad \text{eqn. 2}$$

where "theta" the rotational angle of the sensor, "M" is a constant, "B" is a constant and "signal" is the output of the sensor in volts. For the preferred sensor with a range of 0.5v to 4.5v for theta angles of −45 degrees to +45 degrees , "M" is 22.5, and "B" is −56.25 degrees. The relationship between sensor signal and sensor position is programmed into controller 106, which is configured to receive the sensor signal and to convert it into an angle (theta). Controller 106 then uses this angle (theta) to determine the height of he controller, as described above.

To calibrate the sensors, controller 106 takes the two sensor signal values from each sensor in steps 202, 204, and interpolates between them to correlate a range of sensor signal values to a corresponding range of sensor rotational angles (theta). This is possible since the two sensor signal values are read when the compactor is at two corresponding predetermined fixed heights of the compactor, namely the bottom height (zero) at step 202 and the top height (42 inches) at step 204. Thus controller 106 has two pairs of values for each sensor with which to interpolate intermediate values: (1) a height and corresponding sensor signal value at the top of the compactor's range, and (2) a height and corresponding sensor signal value for the top position of the compactor frame.

Controller 106 interpolates between these values to generate a revised sensor equation (eqn. 2), and thereby provide calibrated, accurate values of theta over the entire range of vertical motion of the compactor.

One way in which this calibration can be calculated, stored in used by controller 106 is by controller 106 determining a new "M" and "B" in the sensor equation (eqn. 2). Alternatively, controller 106 could calculate a plurality of sensor signal value/compactor position pairs for each sensor, and use them as a lookup table.

Of course the two predetermined positions do not need to be the absolute top and the very bottom, however. The predetermined positions can be any position in the compactor's range of motion. Furthermore, a variety of means can be provided to position the compactor at these various vertical positions. For example, these additional stops can be manually engageable, such as pins that the operator manually inserts into the module builder to abut the compactor in predetermined positions other than the top and bottom. They could also be automatically actuated stops, such as hydraulic, pneumatic, or electrically actuated stops the are coupled to controller 106. The stops themselves can be mounted on the compactor frame to move with the compactor, or alternatively can be mounted on the module builder chamber and remain stationary.

Alternatively, there could be provided remotely actuated stops such as those described above using hydraulic, pneumatic, or electrical actuators that the operator engages (for example) in the cab of the harvester using a switch, button, lever, or other input device coupled to those actuators. Additional stops would permit the compactor to be stopped more locations in its range of travel. This would permit more accurate linear interpolation and using two points. It would also permit nonlinear interpolation, such as second order interpolation.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates in the preferred embodiment of the invention; however, concepts, as based upon the description, may be employed in other embodiments without departing from the scope of the invention. Accordingly, the following claims are intended to protect the invention broadly as well as in the specific form shown.

The invention claimed is:

1. A system for calibrating a cotton module builder, the builder having a chamber for receiving a volume of cotton bolls and a compactor frame disposed at least partially within the chamber to compress the top of the cotton bolls, the system comprising:
   means for moving the compactor frame between first and second positions;
   means for sensing the position of the compactor frame in the first and second positions; and
   control means for
   receiving a first signal from the means for sensing indicating the first position of the compactor frame,
   receiving a second signal from the means for sensing indicating the second position of the compactor frame after receiving the first signal, and
   calibrating the means for sensing based upon the first and the second signals.

2. The system of claim 1, wherein the control means comprises:
   means for automatically moving the compactor frame to the first position before receiving the first signal; and
   means for automatically moving the compactor frame to the second position after receiving the first signal and before receiving the second signal.

3. The system of claim 1, wherein one of the first and second positions is an uppermost position of the compactor frame, and the other of the first and second positions is a lowermost position of the compactor frame.

4. The system of claim 1, wherein the compactor frame is configured for fore-and-aft pivotal movement between the first position and the second position, and further wherein the compactor frame is prevented from pivoting fore-and-aft in both the first position and the second position and is permitted to pivot fore-and-aft between the first and second positions.

5. The system of claim 1, wherein the means for sensing includes means for generating signals indicating both the vertical position of the compactor frame and a fore-and-aft tilt of the compactor frame, and further wherein the control means includes means for calibrating the means for sensing to provide both a corrected height and a corrected fore-and-aft tilt of the compactor frame.

6. The system of claim 1, wherein the control means includes:
   means for interpolating between the first and second sensor signals; and
   means for correlating a range of sensor signals to a corresponding range of sensor rotational angles.

7. A computer implemented method for calibrating a sensor of a cotton module builder, the builder including a module builder chamber for receiving a volume of cotton bolls, a compactor frame disposed at least partially within the chamber to compress the top of the volume of cotton bolls, and at least one position sensor disposed to sense the relative position of the compactor frame with respect to the chamber, the method comprising the steps of:
   receiving a first electronic signal from the at least one position sensor indicating a first predetermined position of the compactor frame;
   receiving a second electronic signal from the at least one position sensor indicating a second predetermined position of the compactor frame after receiving the first signal; and
   electronically calibrating the at least one position sensor based upon the first and the second signals.

8. The method of claim 7, further comprising the steps of:
   automatically moving the compactor frame to the first predetermined position before receiving the first electronic signal, and
   automatically moving the compactor frame to the second predetermined position after receiving the first signal and before receiving the second electronic signal.

9. The method of claim 7, wherein one of the first and second predetermined positions is an uppermost position of the compactor frame, and the other of the first and second predetermined positions is a lowermost position of the compactor frame.

10. The method of claim 7, wherein the compactor frame is configured for fore-and-aft pivotal movement between the first predetermined position and the second predetermined position, the method further comprising the steps of:
preventing the compactor frame from pivoting fore-and-aft in the first predetermined position; and
preventing the compactor frame from pivoting fore-and-aft in the second predetermined position.

11. The method of claim 7, further comprising the steps of:
receiving electronic signals indicating both the vertical position of the compactor frame and a fore-and-aft tilt of the compactor frame; and
simultaneously calibrating the at least one sensor to provide both a corrected vertical position and a corrected fore-and-aft tilt of the compactor frame.

12. The method of claim 7, wherein the step of electronically calibrating the at least one position sensor includes the steps of:
interpolating between the first and second sensor signals; and
correlating a range of sensor signals to a corresponding range of sensor rotational angles.

13. A system for calibrating sensors of a cotton module builder having a compactor frame for compacting cotton bolls, the system comprising:
at least one compactor frame position sensor disposed to sense the position of the compactor frame; and
an electronic controller configured
to receive a first position signal from the position sensor indicating a first predetermined position of the compactor frame,
to receive a second position signal from the position sensor indicating a second predetermined position of the compactor frame after receiving the first signal, and
to calibrate the position sensor based upon the first and the second signals.

14. The system of claim 13, wherein the electronic controller is further configured
to automatically move the compactor frame to the first predetermined position before receiving the first signal, and
to automatically move the compactor frame to the second predetermined position after receiving the first signal and before receiving the second signal.

15. The system of claim 13, wherein one of the first and second predetermined positions is an uppermost position of the compactor frame, and the other of the first and second predetermined positions is a lowermost position of the compactor frame.

16. The system of claim 13, wherein the compactor frame is configured for fore-and-aft pivotal movement between the first predetermined position and the second predetermined position, and further wherein the compactor frame is constrained from pivoting fore-and-aft in both the first predetermined position and the second predetermined position.

17. The system of claim 13, wherein the at least one position sensor is configured to generate signals indicating both the vertical position of the compactor frame and a fore-and-aft tilt of the compactor frame, and further wherein the controller's configured to simultaneously calibrate the at least one sensor to provide both a corrected vertical position and a corrected fore-and-aft tilt of the compactor frame.

18. The system of claim 13, wherein the electronic controller is configured to interpolate between the first and second position signals.

* * * * *